(12) United States Patent
Fujimori et al.

(10) Patent No.: US 8,090,047 B2
(45) Date of Patent: Jan. 3, 2012

(54) SYSTEM AND METHOD FOR PROGRAMMABLY ADJUSTING GAIN AND FREQUENCY RESPONSE IN A 10-GIGABIT ETHERNET/FIBRE CHANNEL SYSTEM

(75) Inventors: Ichiro Fujimori, Irvine, CA (US); Davide Tonietto, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/795,808

(22) Filed: Jun. 8, 2010

(65) Prior Publication Data

US 2010/0246658 A1 Sep. 30, 2010

Related U.S. Application Data

(63) Continuation of application No. 11/695,405, filed on Apr. 2, 2007, now Pat. No. 7,733,998, which is a continuation of application No. 10/337,567, filed on Jan. 7, 2003, now Pat. No. 7,206,366.

(60) Provisional application No. 60/402,120, filed on Aug. 7, 2002.

(51) Int. Cl.
*H04L 27/00* (2006.01)
(52) U.S. Cl. ........................................ 375/295; 708/322
(58) Field of Classification Search .................. 375/295, 375/344, 345, 229, 230, 350; 708/322, 323; 455/250.1, 251.1
See application file for complete search history.

(56) References Cited

U.S. PATENT DOCUMENTS

| | | | |
|---|---|---|---|
| 3,821,797 A | 6/1974 | Suzuki et al. | |
| 4,327,331 A | 4/1982 | Yoshimi et al. | |
| 5,638,138 A | 6/1997 | Hickman | |
| 5,828,700 A | 10/1998 | Korn | |
| 5,841,810 A | 11/1998 | Wong et al. | |
| 5,844,941 A | 12/1998 | Mack et al. | |
| 5,875,272 A | 2/1999 | Kewitsch et al. | |
| 6,307,668 B1 | 10/2001 | Bastien et al. | |
| 6,606,013 B2 | 8/2003 | Bachelay et al. | |
| 6,735,181 B1 * | 5/2004 | Babitch | 370/290 |
| 6,940,539 B1 * | 9/2005 | Tokman et al. | 348/162 |
| 2003/0073407 A1 * | 4/2003 | Cutler | 455/67.1 |
| 2008/0198954 A1 * | 8/2008 | Uribe et al. | 375/345 |

FOREIGN PATENT DOCUMENTS

| | | |
|---|---|---|
| EP | 1069712 A | 1/2001 |
| EP | 1120925 A | 8/2001 |

OTHER PUBLICATIONS

Sun et al., "80 nm Ultra-wideband Erbium-doped Silica Fibre Amplifier", Electronic Letters, IEE Stevenage, GB, vol. 33, No. 23, Nov. 6, 1997, pp. 1965-1967, XP006008152 ISSN: 0013-5194.

\* cited by examiner

*Primary Examiner* — Khai Tran
(74) *Attorney, Agent, or Firm* — Thomas, Kayden, Horstemeyer & Risley

(57) ABSTRACT

Systems and methods for optimizing operation of a transceiver device are disclosed. The method may include parallel processing an input signal through a first path having a first frequency response and a second path having a second frequency response. The second frequency response may be higher than the first frequency response. Signals from the first and second paths may be combined, creating an output signal having a desired gain and frequency. The parallel processing may adjust a gain of at least one of the first path and the second path. The parallel processing may equalize at least one of the first frequency response and the second frequency response. The input signal may be from a 10 GBit Ethernet channel and/or a Fibre channel.

20 Claims, 10 Drawing Sheets

SYSTEM AND METHOD FOR PROGRAMMABLY ADJUSTING GAIN AND FREQUENCY RESPONSE IN A 10-GIGABIT ETHERNET/FIBRE CHANNEL SYSTEM

CROSS-REFERENCE TO RELATED APPLICATIONS/INCORPORATION BY REFERENCE

This application is a continuation of U.S. patent application Ser. No. 11/695,405 filed on Apr. 2, 2007, which is a continuation of U.S. patent application Ser. No. 10/337,567 filed on Jan. 7, 2003, now U.S. Pat. No. 7,206,366, which makes reference to, claims priority to and claims the benefit of U.S. Provisional Patent Application Ser. No. 60/402,120 filed on Aug. 7, 2002.

This application also makes reference to U.S. Pat. No. 6,424,194, U.S. application Ser. No. 09/540,243 filed on Mar. 31, 2000, U.S. Pat. Nos. 6,389,092, 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Using 1.8V Power Supply in 0.13 MM CMOS" filed on Jun. 21, 2002, and U.S. application Ser. No. 60/402,090 entitled "System and Method for Implementing a Single Chip Having a Multiple Sub-layer PHY" filed on Aug. 7, 2002.

All of the above stated applications are incorporated herein by reference in their entirety.

BACKGROUND OF THE INVENTION

Embodiments of the present application relate generally to optical networking hardware, and more particularly to a system and method for performing on-chip synchronization of system signals.

High-speed digital communication networks over copper and optical fiber are used in many network communication and digital storage applications. Ethernet and Fiber Channel are two widely used communication protocols, which continue to evolve in response to increasing need for higher bandwidth in digital communication systems. The Open Systems Interconnection (OSI) model (ISO standard) was developed to establish standardization for linking heterogeneous computer and communication systems. It describes the flow of information from a software application of a first computer system to a software application of a second computer system through a network medium.

The OSI model has seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Importantly, each OSI layer describes certain tasks that may be necessary for facilitating the transfer of information through interfacing layers and ultimately through the network. Notwithstanding, the OSI model does not describe any particular implementation of the various layers.

OSI layers 1 to 4 generally handle network control and data transmission and reception. Layers 5 to 7 handle application issues. Specific functions of each layer may vary depending on factors such as protocol and interface requirements or specifications that are necessary for implementation of a particular layer. For example, the Ethernet protocol may provide collision detection and carrier sensing in the physical layer. Layer 1, the physical layer, is responsible for handling all electrical, optical, opto-electrical and mechanical requirements for interfacing to the communication media. Notably, the physical layer may facilitate the transfer of electrical signals representing an information bitstream. The physical layer may also provide services such as, encoding, decoding, synchronization, clock data recovery, and transmission and reception of bit streams. In high bandwidth applications having transmission speeds of the order of Gigabits, high-speed electrical, optical and/or electro-optical transceivers may be used to implement this layer.

As the demand for higher data rates and bandwidth continues to increase, equipment capable of handling transmission rates of the order of 10 Gigabits and higher is being developed for high-speed network applications. Accordingly, there is a need to develop a 10 Gigabit physical layer device that may facilitate such high-speed serial data applications. For example, XENPAK multi-source agreement (MSA) defines a fiber optical module that conforms to the well-known IEEE standard for 10 Gigabit Ethernet (GbE) physical media dependent (PMD) types. In this regard, XENPAK compatible transceivers may be used to implement the physical layer. Notwithstanding, there is a need for transceivers, which are necessary for implementing 10 Gigabit physical layer applications. The well-known IEEE P802.3ae draft 5 specification describes the physical layer requirements for 10 Gigabit Ethernet applications and is incorporated herein by reference in its entirety. In a XENPAK module, since the 10 Gbps signal is connected locally to the optical components, the 10 Gbps signals do not have to travel long distances. In this case, the frequency response of a receiver in the physical layer should have a flat frequency response to preserve the integrity of the information in the electrical signals being converted from optical to electrical signals. An optical-based transceiver, for example, may include various functional components which may implement tasks such as clock data recovery, clock multiplication, serialization/de-serialization, encoding/decoding, electrical/optical conversion, descrambling, media access control (MAC), controlling, and data storage.

In Fibre channel applications, system manufacturers prefer to use small form factor optical modules such as XFP instead of XENPAK modules, because of the cost savings associated with using multiple ports. In the case of XFP modules, 10 Gb/s signals may travel across the system using a copper (FR4) connection to reach the module. As high-speed communication signals such as 10 Gbps are transmitted over a network, the signal may become attenuated. For a copper media, typically, high frequency components of a communication signal are attenuated more than the lower frequency components. Existing high-speed data receivers attempt to deal with this high frequency attenuation by providing an equalization element that amplifies the incoming signal and amplifies the higher frequency signal components more than the lower frequency signal components. Since Ethernet and Fibre Channel systems exhibit different signal attenuation properties, an optimal equalization element for an Ethernet system will have different characteristics than an optimal equalization element for a Fibre Channel system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention may provide a method and system for adjusting a gain and/or a frequency response of an input signal for a multimode PHY device. The method may include the step of apportioning the input signal into a gain adjustment signal and/or an equalization adjustment signal. Apportionment of the input signal may be achieved within the multimode PHY device. Accordingly, a gain for the gain adjustment signal may be adjusted within the multimode PHY device. The equalization adjustment signal may also be equalized within the multimode PHY device. A summer may subsequently be adapted to sum or combine the adjusted gain adjustment signal and the equalized equalization adjustment signal to create an output equalized signal having a desired gain and/or frequency response.

The apportioned gain adjustment signal may include low frequency components of the input signal, while the apportioned equalization adjustment signal may include high frequency components of the input signal. The apportioning step may further include the step of selecting a determined portion of the input signal that will comprise the gain adjustment signal and/or the equalization signal. The determined portion of the input signal may be the whole of the input signal or a fractional portion of the input signal. The adjusting step may be programmably achieved through one or more bits and/or registers.

The adjustment step may further include the step of amplifying the gain of some or all of the low frequency components that comprise the apportioned gain adjustment signal. Amplification may be achieved equally over all of the low frequency components of the apportioned gain adjustment signal. The equalizing step may further include the step of amplifying the gain of some or all of the high frequency components that comprise the apportioned equalization adjustment signal. The input signal may include signal components from a 10 GigaBit Ethernet operation mode and/or a Fibre channel operation mode. The apportioning step may also include the step of apportioning the input signal so that the gain adjustment signal and the equalization adjustment signal are equivalent to the input signal.

In another embodiment of the invention, a system for adjusting at least one of a gain and a frequency response of an input signal for a multimode PHY device may be provided. The system may include a signal divider for apportioning the input signal into a gain adjustment signal and/or an equalization adjustment signal upon receipt of the input signal. A signal adjuster coupled to the signal divider may adjust a gain of the apportioned gain adjustment signal within the multimode PHY device. An equalizer coupled to the signal adjuster may be configured to equalize the equalization adjustment signal within the multimode PHY device. A summer coupled to the equalizer and signal adjuster may be adapted to sum the adjusted gain adjustment signal and the equalized equalization adjustment signal within the multimode PHY device to create an output equalized signal.

The apportioned gain adjustment signal may include low frequency components of the input signal. The apportioned equalization adjustment signal may include high frequency components of the input signal. The signal divider may further include a selector configured for selecting a determined portion of the input signal that will comprise the gain adjustment signal and the equalization adjustment signal. The selector may be configured to select the determined portion of the input signal that may be the whole of the input signal or a fraction of the input signal.

The signal adjuster may further include a programmable selector that may be adapted for programmably selecting the determined portion of the input signal that will comprise the gain adjustment signal and the equalization signal. The adjuster may further include an amplifier, which may be configured for amplifying a gain of some or all of the low frequency components of the apportioned at least gain adjustment signal. The amplifier may be configured to equally amplify the gain of some or all of the low frequency components that comprise the apportioned gain adjustment signal. The equalizer may further include an amplifier for amplifying the gain of some or all of the high frequency components comprising the apportioned equalization adjustment signal. The input signal may have signal components from a 10 Gigabit Ethernet operation mode and/or a Fibre channel operation mode. Finally, the signal divider may further include an apportioner which may be configured for apportioning the input signal so that the gain adjustment signal and the equalization adjustment signal are equivalent to the input signal.

Another embodiment of the invention provides a method for adjusting at least a gain and/or a frequency response of an input signal for a multimode PHY device. The method may include adjusting a gain of at least a portion of the input signal within the multimode PHY device after receipt of the input signal. At least a remaining portion of the input signal may be equalized within the multimode PHY device. The adjusted at least a portion of the input signal and the equalized at least a remaining portion of the input signal may be summed within the multimode PHY device to create an output equalized signal having a desired gain and frequency response. The adjusted at least a portion of the input signal may include low frequency components of the input signal, and the equalized at least a remaining portion of the input signal may include high frequency components of the input signal. The adjusting step may further include the step of amplifying the gain of at least a portion of the low frequency components and equally amplifying a gain of at least a portion of the low frequency components.

Another embodiment of the invention further provides a system for adjusting at least one of a gain and a frequency response of an input signal for a multimode PHY device. The system may include at least one adjuster adapted to adjust a gain of at least a portion of the input signal within the multimode PHY device. At least one equalizer may be adapted to equalize at least a remaining portion of the input signal within the multimode PHY device. At least one summer may be adapted to sum the adjusted at least a portion of the input signal and the equalized at least a remaining portion of the input signal within the multimode PHY device to create an output equalized signal having a desired gain and frequency response.

The adjusted at least a portion of the input signal may include low frequency components of the input signal, and the equalized at least a remaining portion of the input signal may include high frequency components of the input signal. The adjuster may further include at least one controller adapted to control amplification of the gain of at least a portion of the low frequency components. The at least one controller may be adapted to control equal amplification of the gain of the at least a portion of said low frequency components. The at least one controller may be further adapted to control amplification of the at least a portion of the high frequency components of the input signal. The at least one controller may be further adapted to control adjustment of the at least a portion of the high frequency components of the input signal independent of the at least a portion of the low frequency components. The input signal may include signal components from at least one of a 10 GigaBit Ethernet operation mode and a Fibre channel operation mode.

These and other advantages, aspects and novel features of the present invention, as well as details of an illustrated

DETAILED DESCRIPTION OF THE INVENTION

Figure 1:
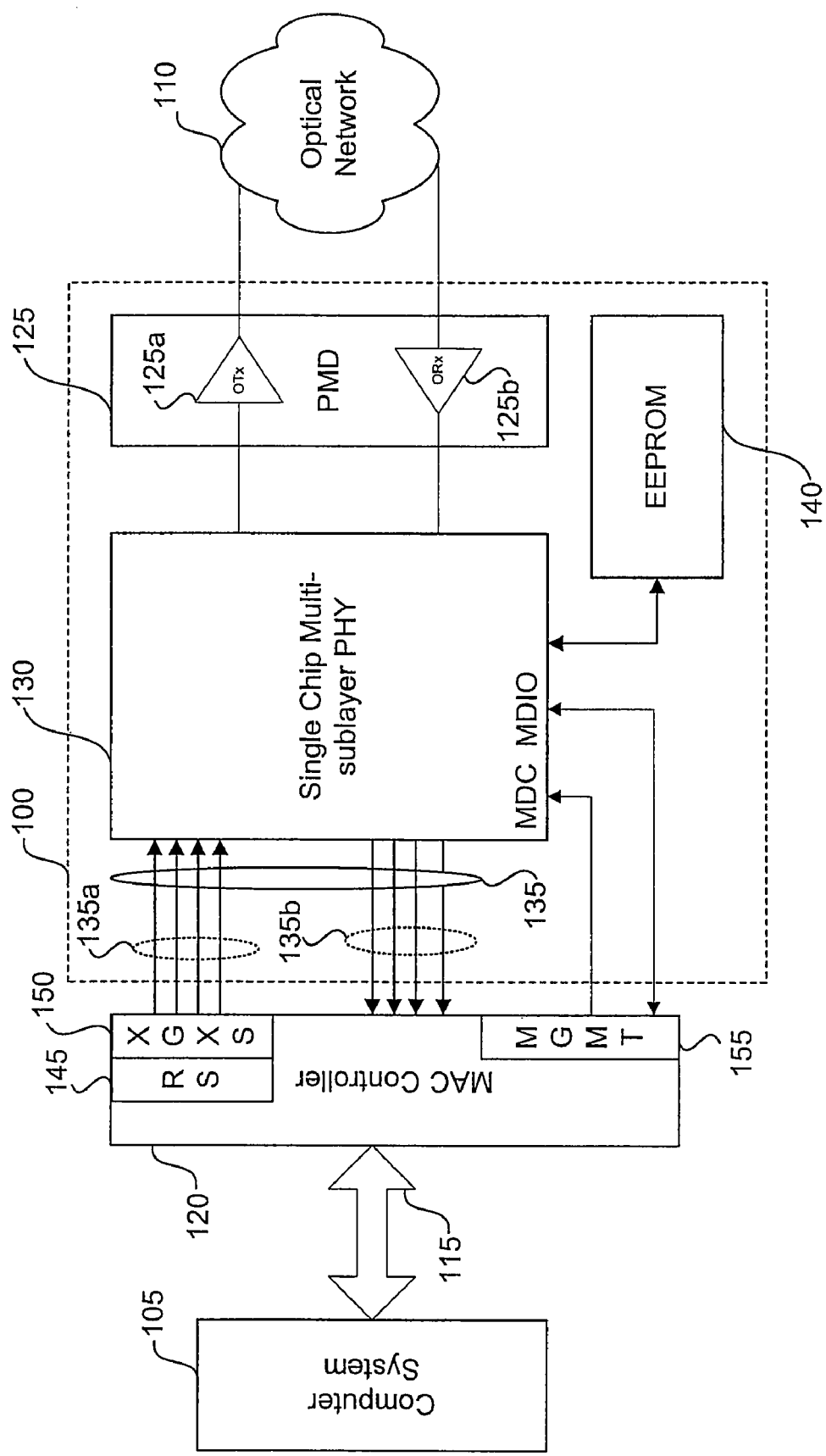
FIG. 1 is a block diagram of an exemplary transceiver module in accordance with an embodiment of the invention.

FIG. 1 is a block diagram of an exemplary transceiver module 100 in accordance with an embodiment of the invention. Referring to FIG. 1, there is illustrated a computer system 105, a medium access control (MAC) controller 120, a MAC controller interface 115, an optical network 110, a single-chip multimode multi-sublayer PHY device 130, an electrically erasable programmable read only memory (EEPROM) 140, a PMD transmitter 125a and a PMD receiver 125b. PMD transmitter 125a and PMD receiver 125b may be integrated into a single PMD 125 such as a chip or IC, although the invention is not limited in this regard. Transceiver module 100 may be an integrated device, which may include the single-chip multimode multi-sublayer PHY device 130, the EEPROM 140, the optical transmitter 125a and the optical receiver 125b. Computer system 105 may interface with MAC controller 120 through MAC controller interface 115 and may communicate with the optical network 110 through the transceiver module 100. The single-chip multimode multi-sublayer PHY device 130 may also be referred to as a multimode PHY for brevity.

Transceiver module 100 may be configured to communicate, namely transmit and receive, data between computer system 105 and optical network 110. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1 may provide services to layer 2 and layer 2 may provide services to layer 3. The data link layer, layer 2, may include a MAC layer whose functionality may be handled by a MAC controller 120. In this regard, MAC controller 120 may be configured to implement the well-known IEEE 802.3ae Gigabit Ethernet protocol.

In the arrangements of FIG. 1, the computer system 105 may represent layer 3 and above, the MAC controller 120 may represent layer 2 and above and the transceiver module 100 may represent layer 1. The computer system 105 may be configured to build the five highest functional layers for data packets that are to be transmitted over the optical network 110. Since each layer in the OSI model may provide a service to the immediately higher interfacing layer, the MAC controller 120 may provide the necessary services to the computer system 105 to ensure that packets are suitably formatted and communicated to the transceiver module 100. During transmission, each layer may add its own header to the data passed on from the interfacing layer above it. However, during reception, a compatible device having a similar OSI stack may strip off the headers as the message passes from the lower layers up to the higher layers.

The transceiver module 100 may be configured to handle all the physical layer requirements, which may include, but is not limited to, packetization, serialization/deserialization (SERDES) and data transfer. Transceiver module 100 may operate at a plurality of data rates, which may include 10 Gbps. Data packets received by the transceiver module 100 from MAC controller 120 may include data and header information for each of the above six functional layers. The transceiver module 100 may be configured to encode data packets that are to be transmitted over the optical medium of the optical network 110. The transceiver module 100 may also be configured to decode data packets received from the optical network 110.

The MAC controller 120 may interface with the single-chip multimode multi-sublayer PHY 130 of the transceiver module 100 through a 10 Gbps Ethernet attachment unit interface (XAUI) 135. The XAUI 135 may be a low pin count device having a self-clocked bus, which directly evolved from lower data rate protocols. The XAUI may function as an extender interface for a 10 Gigabit media independent interface (XMGII). In this regard, MAC controller 120 may also include an XGMII extender sublayer (XGXS) interlace 150 and a reconciliation sublayer (RS) interface 145. MAC controller 120 may include an integrated link management (MGMT) interface 155 that may facilitate communication between MAC controller 120 and a management data input/output (MDIO) interface of the single-chip multi-sublayer PHY 130.

In one aspect of the invention, XAUI 135 may be configured to utilize a plurality of serial data lanes on each of its receive 135a and transmit 135b interfaces to achieve compatible 10 GbE operational speeds. Notably, the XAUI 135 may be configured as two, 4-bit interfaces, each with four serial lines, thereby achieving a throughput of about 10 Gbps. In accordance with the embodiments of FIG. 1, XAUI 135a may be configured to transmit data from the MAC controller 120 to the single-chip multimode multi-sublayer PHY 130. Additionally, XAUI 135b may be configured to transmit data from the single-chip multimode multi-sublayer PHY 130 to the MAC controller 120.

The single-chip multimode multi-sublayer PHY 130 may support multiple modes of operation. In this regard, the single-chip multimode multi-sublayer PHY 130 may be configured to operate in one or more of a plurality of communication modes. Each communication mode may implement a different communication protocol. These communication modes may include, but are not limited to, 10 GbE, fibre channel and other similar protocols. The single-chip multimode multi-sublayer PHY 130 may be configured to operate in a particular mode of operation upon initialization or during operation.

The single-chip multimode multi-sublayer PHY 130 may also include a fully integrated serialization/deserialization device, which may also be configured to operate at speeds of 10 Gbps. During transmission, the single-chip multimode multi-sublayer PHY 130 may serialize the data received over the 4-bit XAUI 135*a* and transmit the data in a format such as a single 10 Gbps stream via the PMD transmitter 125*a*. During reception, the single-chip multimode multi-sublayer PHY 130 may de-serialize a single 10 Gbps signal received by the PMD Rx 125*b* and transmit the data in a format such as a 4-bit×3.125 Gbps datastream over XAUI 135*b*.

The PMD 125 may include at least one PMD transmitter 125*a* and at least one PMD receiver 125*b*. In operation, PMD 125 may be configured to receive data from and transmit data to the optical network 110. The PMD transmitter 125*a* may transmit data originating from the computer system 105 over the optical network 110. The PMD receiver 125*b* may receive data destined for computer system 105 from the optical network 110 and transmit the data to the computer system 105. The PMD 125 may also be configured to function as an electro-optical interface. In this regard, electrical signals may be received by PMD transmitter 125*a* and transmitted in a format such as optical signals over the optical network 110. Additionally, optical signals may be received by PMD receiver 125*b* and transmitted as electrical signals to the computer system 105. In one aspect of the present invention, for Ethernet operation, the 10 Gigabit data rate may actually be 10.3125 Gbps and for Fibre Channel operation, the 10 Gigabit data rate may actually be 10.516 Gbps, although the invention is not limited in this regard.

The transceiver module 100 may also include an EEPROM 140. The single-chip multimode multi-sublayer PHY 130 may be coupled to EEPROM 140 through an interface such as a serial interface or bus. EEPROM 140 may be programmed with information which may include parameters and/or code that may effectuate the operation of the single-chip multimode multi-sublayer PHY 130. The parameters may include configuration data and the code may include operational code such as firmware, although it should be recognized that the information is not limited in this regard.

Figure 2:
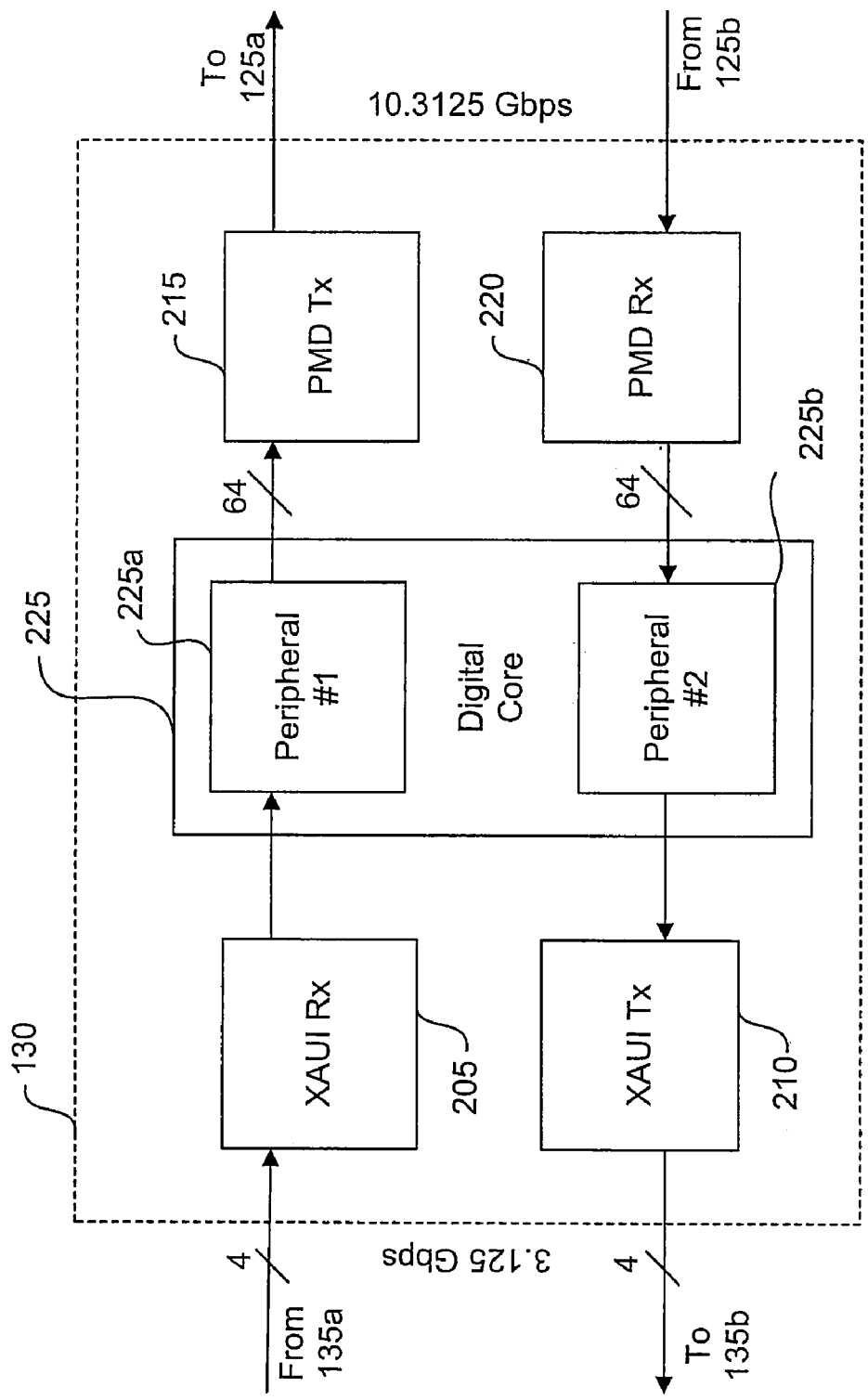
FIG. 2 is a block diagram of an exemplary single-chip multimode multi-sublayer PHY used in the transceiver module of FIG. 1 in accordance with an embodiment of the invention.

FIG. 2 is a block diagram of an exemplary single-chip multimode multi-sublayer PHY 130 used in the transceiver module of FIG. 1 in accordance with an embodiment of the invention. Referring now to FIG. 2, the single-chip multimode multi-sublayer PHY 130 may include a XAUI receiver 205, a XAUI transmitter 210, a PMD transmitter 215, and a PMD receiver 220. The single-chip multimode multi-sublayer PHY 130 may further include a digital core 225 which may have one or more peripherals, for example, peripheral #1 225*a* and peripheral #2 225*b*. The digital core 225 may include an XGXS PCS sublayer and a PMD PCS sublayer. A XAUI TX/RX sublayer may include the XAUI transmitter 210 and XAUI receiver 205 sections. A PMD TX/RX sublayer may include the PMD transmitter 215 and PMD receiver 220 sections. Various sublayers of the single-chip multimode multi-sublayer PHY 130 may be fabricated in 0.13 micron CMOS technology.

In operation, digital core 225 may be configured to serialize and deserialize (SERDES) received data. Data from the XAUI 135*a* may be received at XAUI receiver 205, serialized by the digital core 225, and transmitted as a single 10 Gbps datastream by the PMD transmitter 215. This may be considered the transmit path. Data from the optical PMD receiver 125*b* may be received at PMD receiver 220, deserialized by the digital core 225, and transmitted as, for example, 4-bit× 3.125 Gbps streams by the XAUI receiver 210. This may be considered the receive path.

Figure 3:
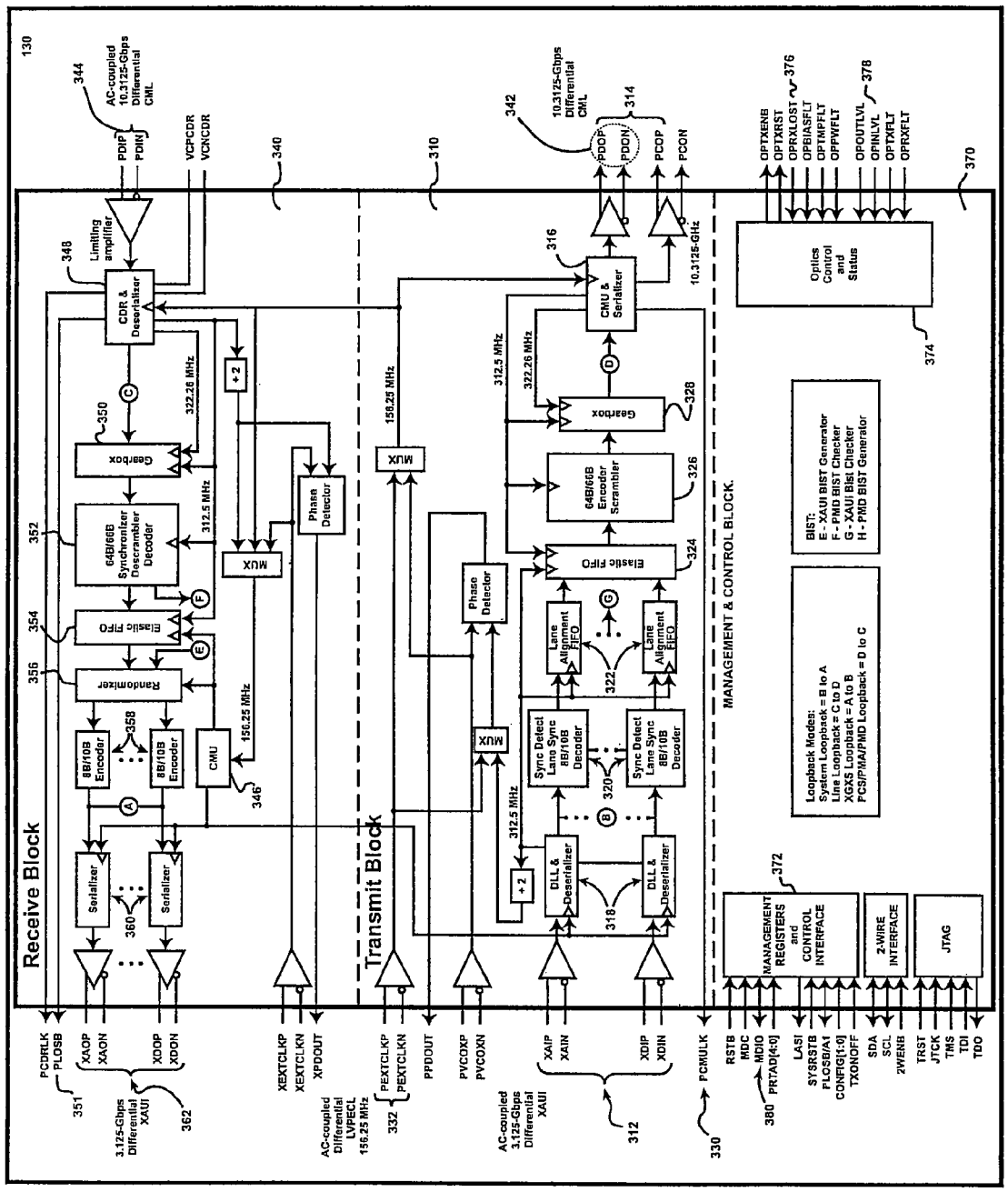
FIG. 3 is a schematic block diagram illustrating an embodiment of the single-chip multimode multi-sublayer PHY of FIG. 2 in accordance with an embodiment of the invention.

FIG. 3 is a schematic block diagram illustrating an embodiment of the single-chip multimode multi-sublayer PHY 130 of FIG. 2 in accordance with an embodiment of the invention. FIG. 3 may provide a more detailed schematic block diagram of the single-chip multimode multi-sublayer PHY 130 of FIG. 2, which may be used in the transceiver module 100 of FIG. 1. Referring to FIG. 3, the single-chip multimode multi-sublayer PHY 130 may include three main functional blocks. Namely, a transmit block 310, a receive block 340, and a management and control block 370. Clock interfaces may be provided for configuring the XAUI and PMD interfaces for operating in a synchronous mode or an asynchronous mode.

The transmit block 310 may include a clock multiplier unit (CMU) and serializer block 316, a gearbox 328, an encoder scrambler block 326, at least one elastic FIFO 324, one or more lane alignment FIFOs 322, one or more lane detect lane sync decoders 320, and one or more DLL and deserializer 318. The receive block 340 may include a CDR deserializer 348, a gearbox 350, a synchronizer descrambler decoder block 352, at least one elastic FIFO 354, a randomizer 356, one or more encoders 358, one or more serializers 360, and a CMU 346. The management and control block 370 may include a management registers and control interface block 372 and an optics and control status block 374.

In operation, the transmit block 310 may be configured to receive data formatted in a format such as a 4-lane 3 Gigabit data at the XAUI receivers 312 and reformat the received data in a format suitable for 10 Gigabit serial transmission at the PMD differential CML drivers 314. The PMD CMU and serializer 316 in the PMD TX/RX sublayer may be configured to be phase-locked (PL) to a reference clock such as an external reference clock. In one aspect of the invention, each of the XAUI receivers 312 may be configured to handle one lane of received data. In this regard, each of the XAUI receivers 312 in the XAUI TX/RX sublayer may include an internal delayed-lock loop (DLL), which may be adapted to synchronize the sampling clock signal to any incoming data signal.

A PLL is an electronic circuit that may be configured to control a frequency source such as an oscillator, so that it maintains a constant phase angle relative to a reference signal. The reference signal may be extracted from a received signal. PLLs may be used for applications such as, bit synchronization, symbol synchronization, and coherent carrier tracking. An exemplary digital PLL (DPLL) circuit may include a serial shift register, a phase corrector circuit and a local clock signal. The serial shift register may be configured to receive digital input samples. The digital input samples may be extracted from the received signal. Preferably, the local clock signal may be stable enough to supply clock pulses that may drive the serial shift register. The phase corrector circuit may be adapted to take the local clock signal and regenerate a stable clock signal that may be in phase with the received signal. In this regard, the phase corrector circuit may be configured to slowly adjust the phase of the regenerated clock signal to match the received signal. The regenerated clock signal may be utilized to sample the received data and determine the value of each received bit.

In operation, the received signal may be sampled at the local clock rate. This may generally be a multiple of the nominal regenerated clock frequency such as 32 times. Each sample, whether (0) or one (1), may be shifted into the shift register. The need to adjust the phase may be determined by viewing a set of samples of the received signal. At each regenerated bit period, the shift register may be consulted. If the center of the received bit lies at the center of the shift register, the two clocks may be deemed to be in phase and no compensation or adjustment may be necessary. If the regenerated clock signal lags the reference signal, then the phase adjuster may provide compensation by advancing the regenerated clock. If the regenerated clock signal leads the reference signal, then the phase adjuster may provide compensation by retarding the regenerated clock.

Accordingly, after synchronization, a 3 Gigabit sampling clock signal, for example, may be configured to sample the data signal in the center of a data eye pattern. In this arrangement, a phase relationship between the edge transitions of the data signal and those of the sampling clock signal may be determined and compared by a phase/frequency discriminator. Output pulses from the discriminator may indicate the direction that may be required for adequately correcting a phase of the signal. Additionally, a loop filter may be configured to smooth any pulses that may occur in the signal. An output signal generated by the loop filter may be adapted to control one or more internal phase interpolators, which may be used to generate the sampling clock. The XAUI CMU 316 may be adapted to function as a phase locked loop (PLL) within the XAUI TX/RX sublayer and may be configured to generate clocks for internal DLL phase interpolations.

The single-chip multimode multi-sublayer PHY 130 may include one or more loss-of-signal (LOS) detect circuits. In one embodiment of the invention, the single-chip multimode multi-sublayer PHY 130 may be configured to include a loss-of-signal (LOS) detect circuit for each XAUI DLL within the XAUI TX/RX sublayer. In this regard, the LOS detect circuits may be configured to monitor and detect data presence at the XAUI receiver inputs 312. A minimum single-ended input signal swing may be used for a valid phase lock condition although the invention is not so limited. The status of each individual LOS detector may be determined from one or more bits and/or internal register of the single-chip multimode multi-sublayer PHY 130.

In one aspect of the present invention, the XAUI serial inputs 312 for the transmit block 310 of the XAUI TX/RX sublayer may be AC-coupled. In this regard, AC coupling may prevent voltage drops across input devices of the single-chip multimode multi-sublayer PHY 130 whenever the input signals may be sourced from a higher operating voltage device. In a case where DC coupling may be used, it may be necessary to ensure that the input signals do not exceed certain $V_{DD}$ levels. Additionally, noise due to overshooting and undershooting of transient currents may also be appropriately handled.

Each XAUI serial data stream for the XAUI serial inputs 312 may be deserialized by one of the DLL and de-serializers 318 integrated within the XAUI TX/RX sublayer. DLL and de-serializers 318 may include one or more serial-to-parallel converters that may be adapted to create, for example, a 10-bit word from the receive serial input data stream. DLL output clocks may be provided and configured to drive the serial-to-parallel converters and/or DLL and de-serializer 318. In normal operation, the DLL may recover the clock from the input data signal. In a case where no data is present, the clock may be recovered from an internal reference clock. In this regard, the output may be sent to the XGXS PCS sublayer in the digital core 225 (FIG. 1).

The XGXS PCS sublayer may include a synchronization (SYNC) sub-block. The sync acquisition sub-block in the XGXS PCS sublayer may be configured to perform code group synchronization, for example, on the incoming 10-bit bytes resulting from the DLL and de-serializer 318. A two-stage 10-bit shift register may be configured to recognize a valid boundary of the input data stream. For example, the two-stage 10-bit shift register may be configured to recognize a /COMMA/ (K28.5) code group, which may be used to indicate a valid data boundary. In this case, upon detection of a single /COMMA/, or other suitable boundary, at least one of the 8B/10B decoders 320 may be enabled. Upon detection of four /COMMA/ code groups without any intervening invalid code group errors, a sync acquisition may be declared.

The 8B/10B decoders 320 may be configured to perform error checks, which may include, but are not limited to, illegal code checks, disparity checks and invalid code checks. In one aspect of the invention, both an illegal code and a running disparity error may cause an invalid code. In this case, an invalid code counter, which may be maintained for performance monitoring, may be incremented. The invalid code counter may be cleared upon a read access or other suitable method. The 8B/10B decoders 320 may also be configured to handle certain decoding tasks within the XGXS PCS sublayer.

A difference between the number of 1's and 0's in a block of data may be characterized as a running disparity (RD). A RD may be regarded as being positive when there are more ones (1s) than zeros (0s) and negative when there are more zeros (0s) than ones (1s). In an exemplary encoding scheme, each encoded 10-bit word may be assigned a RD of 0, +2, or −2, in order to ensure a high bit transition density for reliable clock recovery. Additionally, the RD encoding may be alternated for DC balancing. The balancing may be achieved by maintaining an equal number of ones (1s) and zeros (0s). Upon receipt of an invalid code, a decoder may replace the invalid code with an error code (/E/) K30.7, and may increment the invalid code counter. Upon receipt of a legitimate error code, /E/, one or more of the 8B/10B decoders 320 may pass the error to the XGXS PCS sublayer without incrementing the invalid counter.

Each of the outputs of the 8B/10 decoders 320 may be coupled to a corresponding one of a plurality of lane alignment FIFOs 322. Each lane alignment FIFO 322 may have a corresponding read and write pointer. In operation, at the start of lane alignment by each of, for example, four lane alignment FIFOs 332, the four Lane Alignment FIFO write-pointers within the XGXS PCS sublayer may be enabled upon detection of a boundary, such as an /A/. The FIFOs common read-pointer may be enabled when all four XAUI lanes have detected /A/. Upon detection of an /A/ in one lane without /A/ detections in the other three lanes within a programmable window or skew budget, all FIFOs may be reset, thereby forcing the lane alignment process to start over again. The lane Alignment FIFOs 322 may be adapted to support lane skew compensation of, for example, 5 byte-clocks. Notwithstanding, in accordance with the invention, the single-chip multimode multi-sublayer PHY 130 may permit about 2I external UIs in compliance with the IEEE 802.3ae standard.

The PMD PCS sublayer may utilize a transmission code to improve the transmission characteristics of information, which may be transferred across a communication link. The transmission code may also support transmission of control and data characters. In this regard, the single-chip multimode multi-sublayer PHY 130 may be configured to support 64B/66B encoding as defined by IEEE 802.2ae clause 49 for transmission code. Advantageously, this may ensure the existence of sufficient synchronization information in the bit stream to make clock recovery more robust at the receiver.

The output of the lane alignment FIFOs 322 may be coupled to at least one elastic FIFO 324. The output of the at least one elastic FIFO 324 may be coupled to an encoder scrambler block 326. The output of the encoder scrambler block 326 may be coupled to a TX gearbox 328 embedded in the PMD PCS sublayer. The frame synchronizer function of the encoder scrambler block 326 may be configured to encode, for example, a 66-bit frame boundary within the received data. This may permit the frame synchronizer function of the frame synchronizer descrambler decoder block 352 to lock to a 66-bit block using a sync header of the 66-bit frame boundary. In one aspect of the invention, the encoder scrambler block may be configured to encode the blocks of data in accordance with the IEEE 802.3ae specification.

The TX gearbox 328 in the PMD PCS sublayer may be adapted to function as a buffer that may convert, for example, 64-bit data to 66-bit data for more efficient serialization. In one aspect of the invention, the TX gearbox 328 may be configured to receive 64-bit data from the scrambler 344 and a 2-bit sync from a type generator at a frequency such as 156.25 MHz. The TX gearbox 328 may produce a 66-bit data output at a frequency such as 322.265 MHz to the PMD CMU and serializer 316 within the PMD TX/RX sublayer. A register bank may be employed which may be accessed in a circular manner. In this regard, data may be read out of the TX gearbox 328 using an internally generated clock signal such as a 322.265 MHz clock. The data may be converted to a 10 Gigabit serial stream within PMD TX/RX sublayer and driven off-chip by the differential CML outputs 314. In one embodiment of the invention, bit zero (0) of frame zero (0) or the least significant bit (LSB), may be shifted out first. The PMD CMU and serializer 316 within the PMD TX/RX sublayer may have a PLL that may be configured to generate a 10 Gigabit clock by multiplying for example, the internal 156.25 MHz reference clock.

The single chip multimode multi-sublayer PHY 130 may also include a lock detect circuit. The lock detect circuit may be configured to monitor the frequency of any internal VCO. The status of the lock detect may be indicated by one or more bits and/or registers, for example bit zero (0) of an analog transceiver status register (ATSR). A register bit such as a P_LKDTCMU bit may also be configured to transition to a high state whenever the PMD CMU PLL is phase locked. The CMU lock detect signal may also be provided as an output status at the PCMULK pin 348.

The CML serial outputs 314, namely PCOP, PCON, PDOP and PDON may be AC-coupled or DC-coupled. A source voltage of about +1.8V may power the CML outputs 314. Various pins on single-chip multimode multi-sublayer PHY 130 may be configured to provide power to the PCOP, PCON, PDOP and PDON CML serial outputs 314. The PCOP, PCON, PDOP and PDON CML serial outputs 314 may be adapted as high-speed CML outputs that may include a differential pair designed to drive, for example, a 50Ω transmission line. An output driver may be back terminated to, for example, a 50Ω on-chip resistor, in order to provide snubbing of any signal reflections.

Management and control block 370 may include suitable control logic and circuitry for controlling management functions of the single-chip multimode multi-sublayer PHY 130. For example, management registers and control interface block 372 may include one or more registers that may be configured to deactivate the optical transmitter in the optical PMD 125a. Deactivation may be achieved, for example, by transmitting a constant logical low level (0) at the output of PMD 125. A polarity of PDIP, PDIN 344 and PDOP, PDON 342 may be reversed in order to accommodate difficult printed circuit board (PCB) layouts. In this regard, each differential signal pair may have its own polarity control bit in the PMD/Optics Digital Control Register 374.

In accordance with the invention, the single-chip multimode multi-sublayer PHY 130 may comply with the jitter specifications proposed for 10 Gbps Ethernet equipment as defined by IEEE 802.3ae standards. Furthermore, the reference clock characteristics may also be adapted to adhere to this standard although the invention is not so limited.

In operation, receiver block 340 may be configured to receive 10 Gigabit serially formatted PMD data. Upon receipt of the serially formatted data, receiver block 340 may reformat the data for transmission in a suitable format such as a 4-lane 3 Gigabit format by XAUI transmitter 210 (FIG. 2). One of the 3 Gigabit CMU clocks, for example, CMU 346 in the XAUI TX/RX sublayer may be adapted to retune some or all of the XAUI transmitters. The XAUI CMU 346 in the XAUI TX/RX sublayer may be phase-locked to, for example, an external reference clock.

The PMD clock and data recovery (CDR) and serializer 348 within the PMD TX/RX sublayer may be configured to generate a clock signal having, for example, the same frequency as the incoming data bit rate (10 Gigabit rate) at the CML serial data inputs, PDIP and PDIN 344. In this regard, the clock may be phase-aligned by a PLL so that it samples the data in the center of the data eye pattern.

The phase relationship between the edge transitions of the data and those of the generated clock may be compared by a phase/frequency discriminator. In this arrangement, a phase relationship between the edge transitions of the data signal and those of the sampling clock signal may be determined and compared by a phase/frequency discriminator. Output pulses from the discriminator may indicate the direction that may be required for adequately correcting a phase of the signal. Additionally, a loop filter may be configured to smooth any pulses that may occur in the signal. An output signal generated by the loop filter may be adapted to control one or more internal phase interpolators, which may be used to generate the sampling clock. The output of the loop filter may control the frequency of the VCO, which may generate the recovered clock. Frequency stability without incoming data may be guaranteed, for example, by an internal reference clock. In this case, the internal reference clock may provide an appropriate clock to which the PLL may lock whenever there is a loss of data signal.

The single-chip multimode multi-sublayer PHY 130 may also include a lock detect circuit that may be adapted to monitor the 10 Gigabit frequency of any internal VCO within the PMD TX/RX sublayer. In one embodiment of the invention, the frequency of the incoming data stream may be configured to be within, for example, ±100 ppm of the 10 Gigabit data stream for the lock detector to declare a signal lock. The lock detect status may be indicated by one or more bits and/or registers, for example, bit zero (0) of the ATSR. In this case, the P_LKDTCDR bit may be configured to transition to a high state whenever the PMD CDR is locked to the incoming data. The CDR lock detect signal may also be provided as an output status at the PCDRLK pin 351.

The single-chip multimode multi-sublayer PHY 130 may also include a LOS detect circuit that may be configured to monitor the integrity of the serial receiver data path in the PMD TX/RX sublayer. A peak detector may be configured to look for a minimum amplitude swing in the signal. In a case where there is no serial data input present, a bit such as a LOS_P bit in the ATSR may be set to zero (0). In one aspect of the invention, during operation, the CDR and deserializer block 348 may attempt to lock to the reference clock whenever the signal level falls below a minimum amplitude swing and a bit such as a LOS_B bit may be set accordingly. The LOS from a peak detector condition may also be reflected at the PLOSB output signal pin 350.

The optics control and status block 374 may be adapted to include at least one OPRXLOS pin 376. The OPRXLOS input pin 376 in the optics control and status block 374 may be utilized by an external optical receiver's LOS monitor to indicate when there is loss-of-light condition. The OPRX-LOS pin 376, whether directly or in combination with the peak detector logic, may be configured to force the CDR to lock to the reference clock. A polarity of the OPRXLOS pin 376 may be programmable through one or more bits and/or registers. For example, an OPINLVL pin 378 may be adapted to control a OPINLVL bit in a PHY identifier register. In accordance with an embodiment of the invention, the OPINLVL bit may be configured to change the polarity of OPRXLOS pin 376.

The PMD CML serial inputs PDIP, PDIN 344 on the single-chip multimode multi-sublayer PHY 130 may be AC-coupled. Advantageously, AC coupling may prevent voltage drops across input devices of the single-chip multimode sublayer PHY 130 when the input signals are sourced from a higher operating voltage device. In a case where DC coupling is used, it may be pertinent to ensure that input signals do not exceed certain $V_{DD}$ levels. Additionally, it may be necessary to compensate for noise due to overshoot and undershoot transients.

The PMD serial data stream may be deserialized to, for example, a 66-bit word format by, for example, a serial-to-parallel converter in the PMD TX/RX sublayer such as CDR and deserializer block 348. An output CDR and deserializer block 348 may provide a clock signal necessary for operation of the serial-to-parallel converter. Under normal operation, the CDR and deserializer block 348 may be configured to recover the clock from the data signal. If there is no data present, the clock may be recovered from a reference clock such as an internal reference clock. The output of the CDR and deserializer block 348 may be sent to the RX Gearbox 350 within PMD PCS sublayer. The RX Gearbox 350 may be configured to perform an equivalent function, albeit in reverse, as the TX Gearbox 328.

The output of the RX gearbox 350 may be coupled to a frame synchronizer descrambler decoder block 352 embedded in the PMD PCS sublayer. The frame synchronizer function of the frame synchronizer descrambler decoder block 352 may be configured to monitor and detect frame boundaries, for example, a 66-bit frame boundary within the received data. The frame synchronizer function of the frame synchronizer descrambler decoder block 352 may lock to 66-bit blocks using a sync header within the 66-bit frame boundary. Once locked, the outputs of 66-bit data blocks may be determined. The descrambler function of the frame synchronizer descrambler decoder block 352 may be configured to process a payload for the received data. In this regard, the descrambler function of the frame synchronizer descrambler decoder block 352, may utilize the same polynomial employed by the scrambler function of the encoder scrambler block 326, to reverse any effects of scrambling. Subsequently, the decoder function of the frame synchronizer descrambler decoder block 352 may decode the blocks of received data. In one aspect of the invention, the decoder may be configured to decode the blocks of received data in accordance with the IEEE 802.3ae specification.

The output of the frame synchronizer descrambler decoder block 352 may be coupled to an elastic FIFO 354 located within the XGXS sublayer. The output of the elastic FIFO 354 may be coupled to a randomizer 356 located within the XGXS PCS sublayer. Randomizer 356 may be configured to reduce EMI during an inter-packet gap (IPG). At least some of the resultant idle patterns at the XAUI transmitters may be repetitive high-frequency signals, which may be due, for example, to at least some of the 8B/10B encoders. The randomizer 356 may output a random pattern, such as an /A/K/R/ pattern, in one or more of the data lanes during the IPG. The randomizer 356 may be configured to start its randomization processing on a column of the data containing, for example, an end-of-packet (EOP) byte (T), and end on a SOP. In one aspect of the invention, randomizer 356 may be adapted to utilize the polynomial, $1+x^3+x^7$ in compliance with the IEEE 802.3ae Draft 5.0 standard.

The output of the randomizer 356 may be coupled to one or more encoders, for example, 8B/10B encoders 358, located within the XGXS PCS sublayer. The 8B/10B encoders 358 may be adapted so that each of 8B/10B encoders may process a lane of data. In this case, the 8B/10B encoders 358 may be configured to convert a byte-wide data stream of random ones (1s) and zeros (0s) into, for example, a 10-bit DC-balanced serial stream of ones (1s) and zeros (0s). In one aspect of the invention, the DC-balanced serial stream of ones (1s) and zeros (0s) may have a maximum run length of about 6. Sufficient bit transitions may be provided, for example by software, to ensure reliable clock recovery.

Each of the outputs of the 8B/10B encoders may be coupled to an input of one or more serializers 360. In operation, data may be read out of the 8B/10B encoder 358 using for example, an internally generated clock. In one aspect of the invention, the internally generated clock may be configured to have a frequency of about 312.0-MHz clock. The data may then be converted to, for example, a 3 Gigabit serial stream within XAUI TX/RX sublayer and driven off-chip. Output pins XAOP, XAON, XDOP and XDON 362 may be configured to drive the output of serializers 360 off-chip. In one aspect of the invention, bit zero (0) of frame zero (0) or the LSB may be shifted out first and may be mapped to "A" of the 8B/10B encoder 358.

A XAUI CMU 346, which may be located within the XAUI TX/RX sublayer, may include a PLL that may have the capability to generate a clock signal such as the 3 Gigabit clock. For example, XAUI CMU 346 may have the capability of multiplying an internal 156.25 MHz reference clock to generate the 3 Gigabit clock. The single-chip multimode multi-sublayer PHY 130 may also include a lock detect circuit. The lock detect circuit may be configured to monitor a frequency of any internal VCO. In this regard, a CMU lock detect bit may be configured to transition to a high state whenever the XAUI CMU 346 PLL gets locked. The lock detect status may be indicated by one or more bits and/or registers, for example, bit 7 of the ATSR.

The XAUI serial outputs, XAOP, XAON, XDOP, XDON 362 may be AC-coupled CML outputs. In this regard, the XAUI serial outputs, XAOP, XAON, XDOP, XDON 362 CML outputs may be powered by for example, by a +1.2V voltage source. The XAUI serial outputs, XAOP, XAON, XDOP, XDON 362 may be adapted to be high-speed outputs and may include a differential pair designated to drive a 50Ω transmission line. The output driver may be back terminated to 500 on-chip resistor, which may provide snubbing of any signal reflections. The output driver may also be configured to possess pre-emphasis capability that may enable it to compensate for frequency selective attenuation of FR-4 traces. Advantageously, this may effectively compensate for any inter symbol interference (ISI) that may occur. The pre-emphasis capability may be controlled by one or more bits and/or registers such as a XAUI pre-emphasis controller register.

In one embodiment of the invention, various interfaces of the single-chip XAUI transmit block 310 and receive block 340 may have the capability to reverse the lane order and/or the lane polarity. Advantageously, XAUI I/O interface lane assignment package pins may be reversed to accommodate difficult PCB layouts. This capability may be controlled via one or more bits or registers such as a XAUI digital control register. In one aspect of the invention, a lane flipper may be configured to perform a byte-wise flip of any internal lane data. This may include, but is not limited to, 32-bit data. By default, lane "A" may be configured to carry byte zero (0), lane "B" may be configured to carry byte one (1), lane "C" may be configured to carry byte two (2), and lane "D" may be configured to carry byte three (3).

In another embodiment of the invention, whenever the lane flipper is enabled, lane "A" may be configured to carry byte three (3), lane "B" may be configured to carry byte two (2), lane "C" may configured to carry byte one (1), and lane "D" may be configured to carry byte zero (0). In this regard, reversal of the lanes may be achieved by setting one or more bits and/or registers. For example, a bit such as a XAUI_TX-_FLIP_B and a XAUI_RX_FLIP_B which may be located in a XAUI digital control register in the management registers and control interface block 372, may be set or cleared in order to reverse the XAUI lane order.

In yet a further embodiment of the invention, one or more XAUI I/O interface bit assignment (P to N) to package pins may be reversed in order to accommodate difficult PCB layouts. Assert bits such as a XAUI_TZ_INV and a XAUI_RX-_INV bit, which may be located in a XAUI digital control register in the management registers and control interface block 372, may be set or cleared in order to reverse the XAUI lane polarity.

In accordance with the invention, the single-chip multimode multi-sublayer PHY 130 may be configured to support asynchronous clocking mode operation of the XAUI and PMD interfaces. The local reference clock or external transmit VCXO may be adapted to function in accordance with the IEEE specifications. In this regard, one or more elastic FIFO buffers may be configured to be an integral part of the asynchronous operation mode. For example, receive block 340 may include one or more elastic FIFOs 354 and the transmit block 310 may include one or more elastic FIFOs 324. The elastic FIFOs 354, 324 may be configured to accommodate a frequency difference of up to 200 ppm between a recovered clock and a local reference clock. The elastic FIFOs 354, 324 may have read and write pointers, which may be used for data access and manipulation. The Idle columns of data may be inserted or deleted during the IPG once the distance between the elastic FIFO's read and write pointers exceed a given threshold. In accordance with one aspect of the invention, idle columns of four bytes of data may be inserted or deleted during the IPG. In addition, a column of sequence orders may be deleted during the IPG once the distance between the elastic FIFO's read and write pointer exceed a threshold. In accordance with another aspect of the invention, the delete adjustments may occur on IPG streams that contain at least two columns of idles or sequence order sets.

Figure 4:
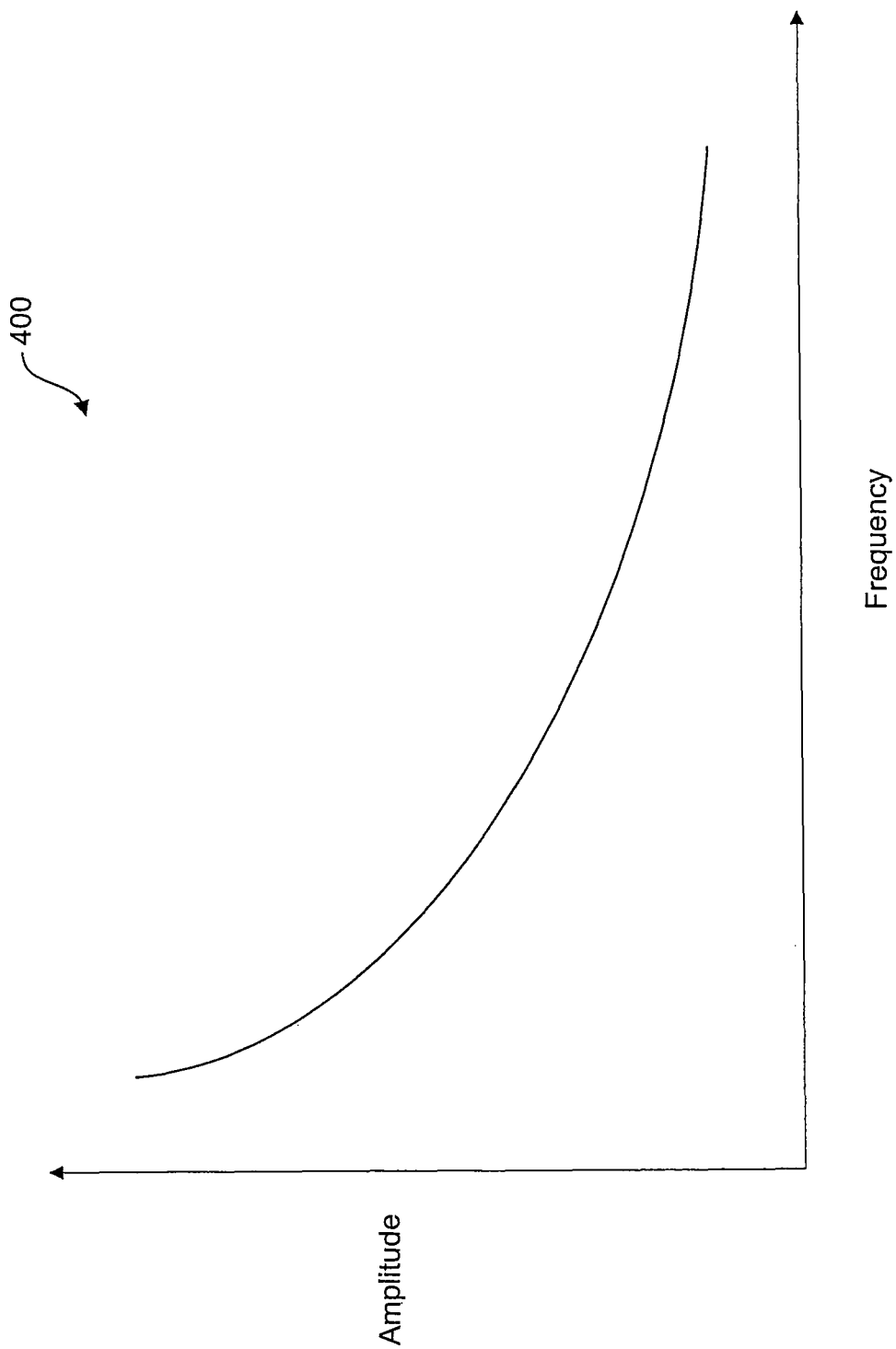
FIG. 4 is a plot illustrating a frequency response of an exemplary communication signal communicated over a high-speed network.

FIG. 4 is a plot 400 illustrating a frequency response of an exemplary communication signal communicated over a high-speed network. In general, communication signals may become attenuated as they traverse a communication media or network. In this regard, the high frequency components of the communication signal may be attenuated more than lower frequency signal components. In typical high-speed communication systems, the amplitude of the received signal component may be attenuated proportionally to the square root of the signal frequency. Accordingly, FIG. 4 graphs this attenuation characteristic.

Figure 5:
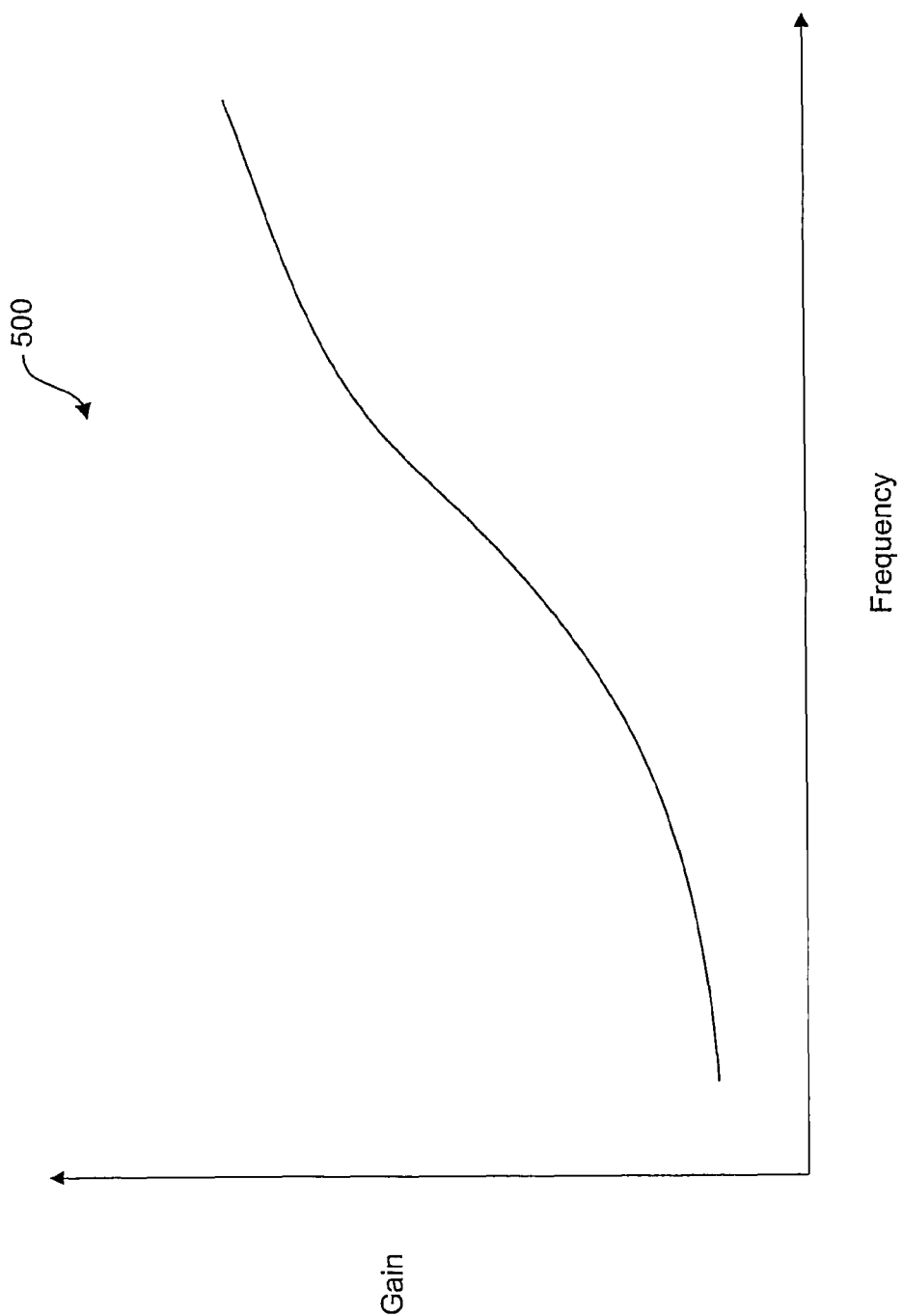
FIG. 5 is a plot illustrating a typical equalization profile that may be utilized to equalize an attenuated communication signal.
Figure 6:
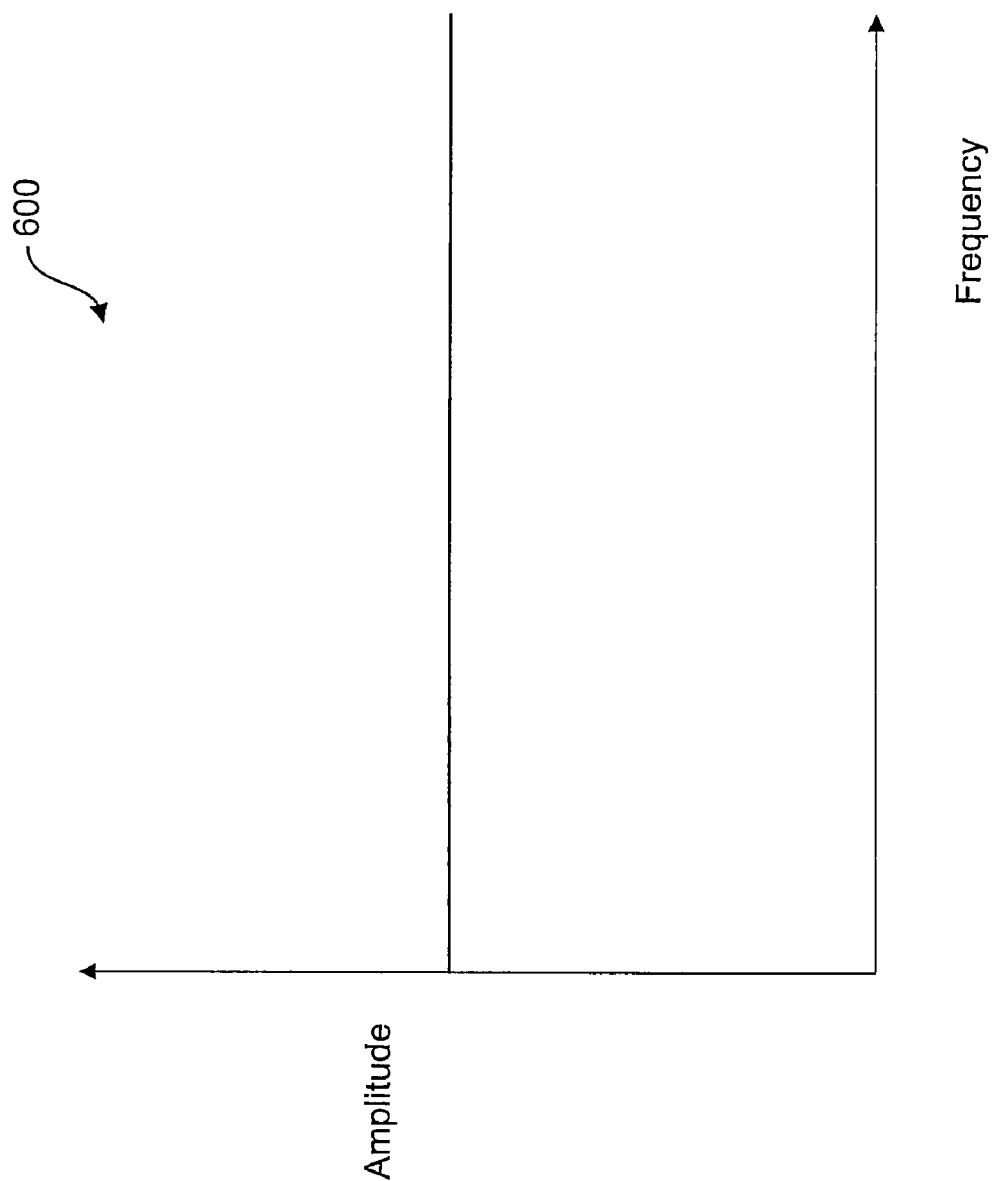
FIG. 6 is a plot illustrating an increase in signal amplitude across frequency components that may comprise the signal.

FIG. 5 is a plot 500 illustrating a typical equalization profile that may be utilized to equalize an attenuated communication signal. In order to minimize or compensate for the high frequency attenuation effect, existing high-speed data receivers provide an equalization element. The equalization element may be configured to amplify the incoming signal so that the higher frequency signal components may be amplified to a greater degree than the lower frequency signal components. Referring to FIG. 5, the higher frequency components may be amplified more than the lower frequency components. Notably, while higher frequency components receive a greater degree of amplification, the lower frequency components may also be amplified. Equalizing the input signal in this manner generally results in a signal that is strong across all frequencies that may comprise the signal. FIG. 6 is a plot 600 illustrating the increase in signal amplitude across frequency components that may comprise the signal.

In general Ethernet-based systems do not exhibit as much high frequency signal attenuation as Fibre Channel systems. Since Ethernet and Fibre Channel systems exhibit different signal attenuation characteristics, certain difficulties may arise in PHY devices that may implement both Ethernet and Fiber channel within a single transceiver. In this regard, multimode mode devices such as the single-chip multimode multi-sublayer PHY 130 may require an optimal equalization processing element that may facilitate both Ethernet and fiber channel modes of operation.

Figure 7A:
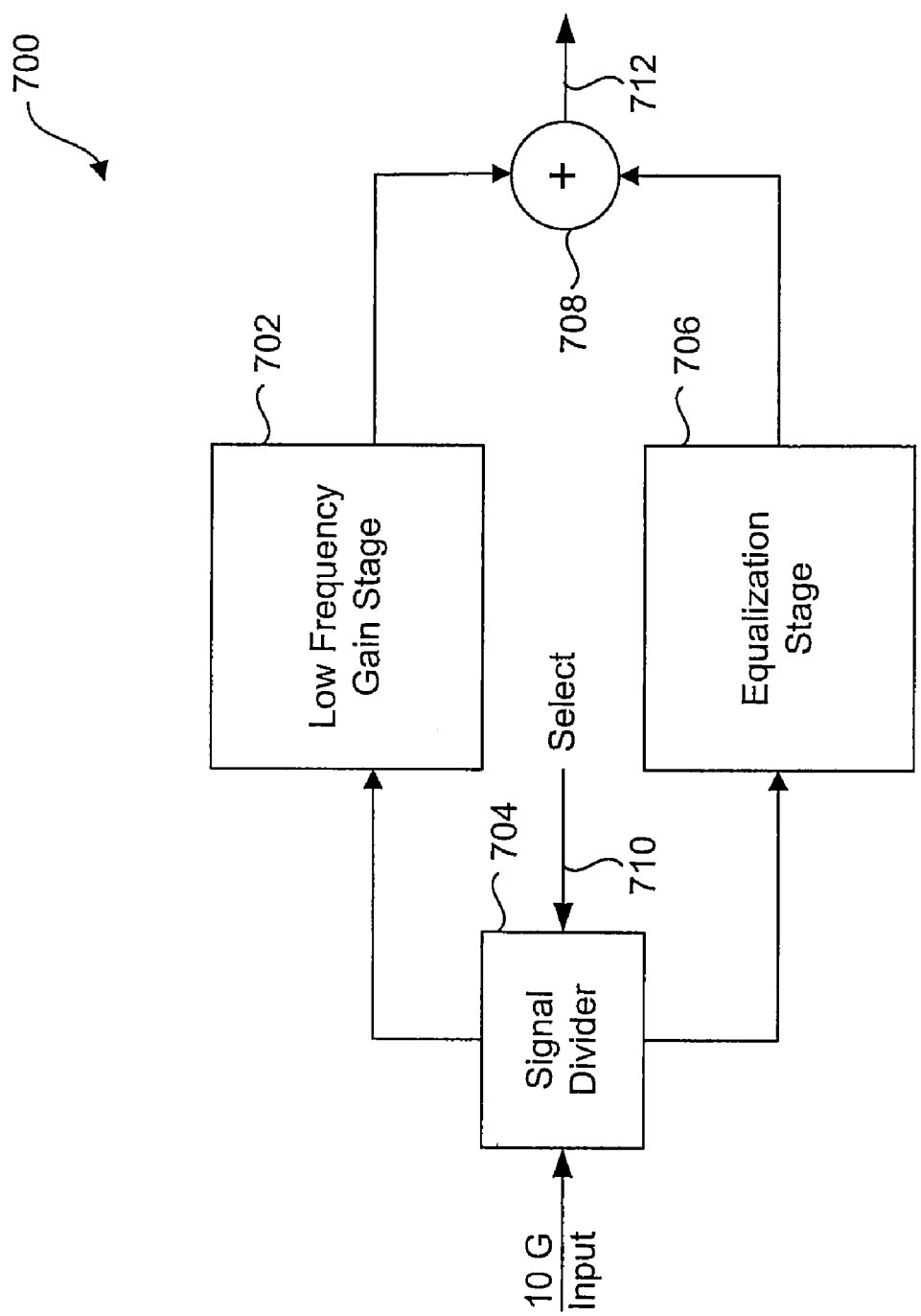
FIG. 7a is a block diagram of an exemplary signal equalization element according to an embodiment of the present invention.

FIG. 7a is a block diagram of an exemplary signal equalization element 700 according to an embodiment of the present invention. Referring to FIG. 7a, equalization element 700 may include a signal divider 704, a low frequency gain stage 702, an equalization stage 706 and a summing element 708. The signal divider 704 may be a programmable signal divider. The equalization element 700 may be integrated within the PMD receive section or the PMD TX/RX sublayer of the single-chip multimode multi-sublayer PHY 130. In one embodiment of the invention, the equalization element 700 may be integrated within a limiting amplifier of the PMD receive section of the single-chip multimode multi-sublayer PHY 130.

The signal divider 704 may be configured to receive, for example, a 10 Gbps input signal and apportion or divide the signal according to a select signal 710. In an illustrative embodiment of the present invention, the select line 710 may be a 3-bit select line, thereby providing eight select levels. Preferably, the select line 710 may be an n-bit select line, thereby providing $2^n$ select levels. In this regard, n may define a resolution of the signal divider 704 and may control apportionment of the input signal to the low frequency gain stage 702 and the equalization stage 706.

The signal divider 704 may be configured to divide the input signal and send a portion of the input signal to the low-frequency gain stage 702 and a portion of the input signal to the equalization stage, depending on the select level indicated by the select line 710. The select line 710 may be configured to indicate that all of the input signal should be sent to the low-frequency gain stage 702 or the equalization stage 706. In a case where the select line 710 may be configured to send all of the input signal to the low frequency gain stage 702, then none of the input signal may be sent to the equalization stage 706. In a case where the select line 710 may be configured to send the entire input signal to the equalization stage 706, then none of the input signal may be sent to the low frequency gain stage 702. Depending on the resolution of the signal divider 704, various levels of the input signal may be sent to the low frequency gain stage 702 and/or the equalization stage 706.

In accordance with one embodiment of the invention, if the 3-bit select line has a binary value of 000, all of the input signal may be provided to the low-frequency gain stage 702 and none of the input signal is provided to the equalization stage 706. If the 3-bit select line has a binary value of 111, a large portion of the incoming signal, and possibly the entire input signal may be provided to the equalization stage 706. Additionally, a small portion of the input signal and possibly none of the input signal may be provided to the low-frequency gain stage 702. Select values that may occur between 000 and 111 may apportion the input signal between the low-frequency gain stage 702 and the equalization stage 706. In one aspect of the invention, the lower the select value, the greater the percentage of the input signal that may be sent to the low-frequency gain stage 702. Accordingly, the higher the select value, the greater the percentage of the input signal that may be sent to the equalization stage 706.

In operation, the low-frequency gain stage 702 may be adapted to equally amplify all low frequency components. These frequency components may comprise that portion of the input signal that the signal divider 704 may apportion to be directed to the low-frequency gain stage 702. The equalization stage 706 may be adapted to amplify at least a portion of higher frequency components. These frequency components may comprise that portion of the input signal that the signal divider 704 may apportion to be directed to the equalization stage 706. In this regard, the equalization stage 706 may amplify the higher frequency components of the input signal to a greater degree than lower frequency components. The equalization processing carried out by the equalization stage 706 may be done in a manner similar to that illustrated in FIG. 5. Subsequently, the summing element 708 may be adapted to sum the various outputs of the low-frequency gain stage 702 and the equalization stage 706 to produce an equalized output signal 712.

Figure 7B:
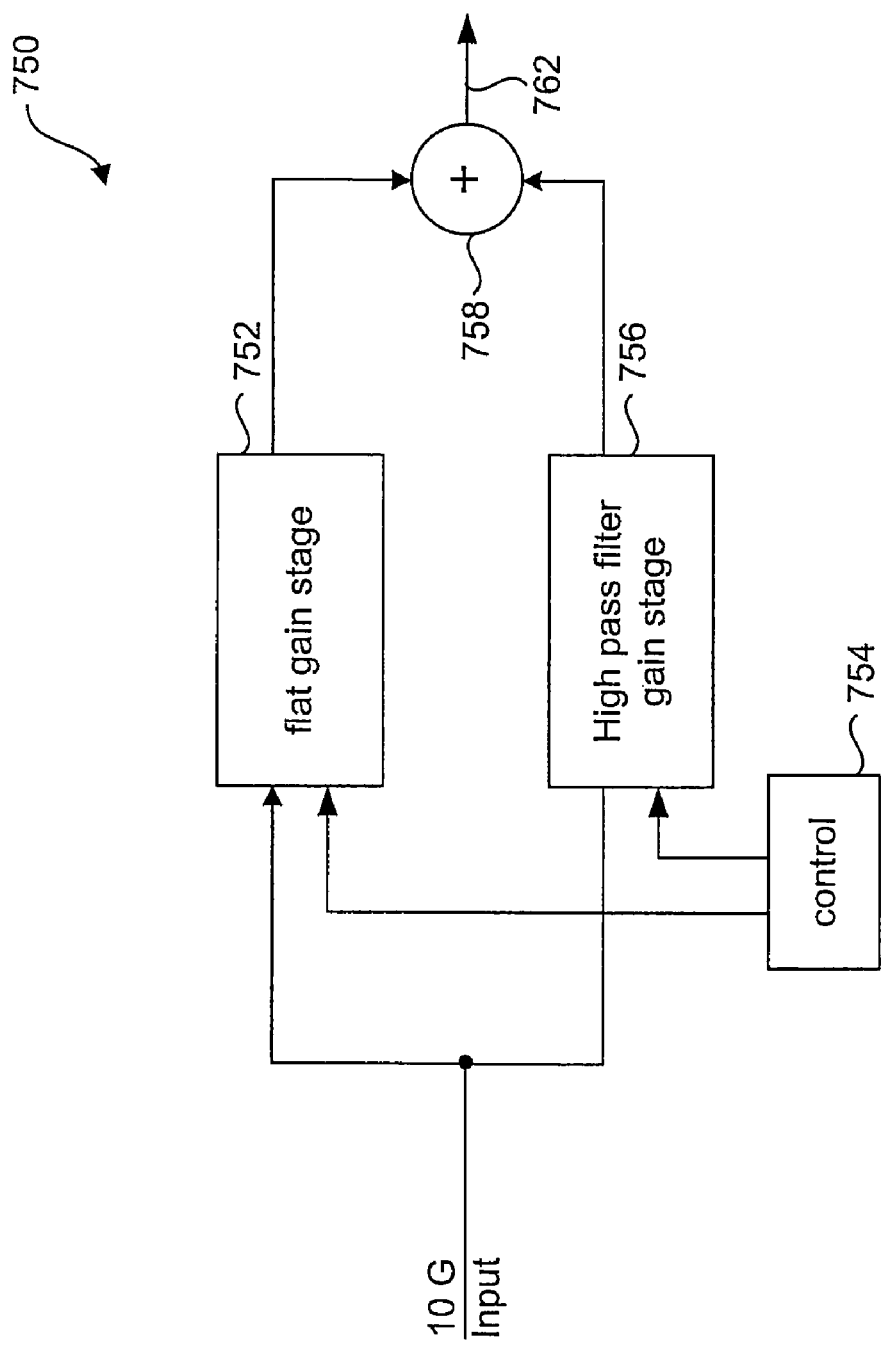
FIG. 7b is an exemplary block diagram of an equalization element that utilizes a flat gain stage and a high pass filter stage in accordance with an embodiment of the invention.

In another embodiment of the invention, an equalization element having a flat gain stage and a high pass filter stage may be provided. FIG. 7b is an exemplary block diagram of an equalization element 750 that utilizes a flat gain stage and a high pass filter stage in accordance with an embodiment of the invention. Referring to FIG. 7b, equalization element 750 may include a flat gain stage 752, a high pass filter gain stage 756, a control block 754 and a summing element 758. The equalization element 750 may be integrated within the PMD receive section or the PMD TX/RX sublayer of the single-chip multimode multi-sublayer PHY 130. In one embodiment of the invention, the equalization element 750 may be integrated within a limiting amplifier of the PMD receive section of the single-chip multimode multi-sublayer PHY 130. The control block 750 may be any suitable controller, processor and/or circuitry that may be adapted to control the flat gain stage 752 and the high pass filter gain stage 756

In operation, the flat gain stage 752 may be adapted to equally amplify at least a portion of the low frequency components. The high pass filter gain stage 756 may be adapted to amplify at least a portion of higher frequency components. In this regard, the equalization stage 756 may amplify the higher frequency components of the input signal to a greater degree than lower frequency components. Control block 754 may be adapted to independently control the gain of the flat gain stage 752 and the gain of the high pass filter gain stage 756. In this regard, the gain of the low frequency components and the high frequency components may be separately controlled. The equalization element 750 of FIG. 7b may achieve a function equivalent to that illustrated in FIG. 7b without implementing a signal divider block 704. The summing element 758 may be adapted to sum the various outputs of the flat gain stage 752 and the high pass filter gain stage 756 to produce an equalized output signal 762.

Figure 8:
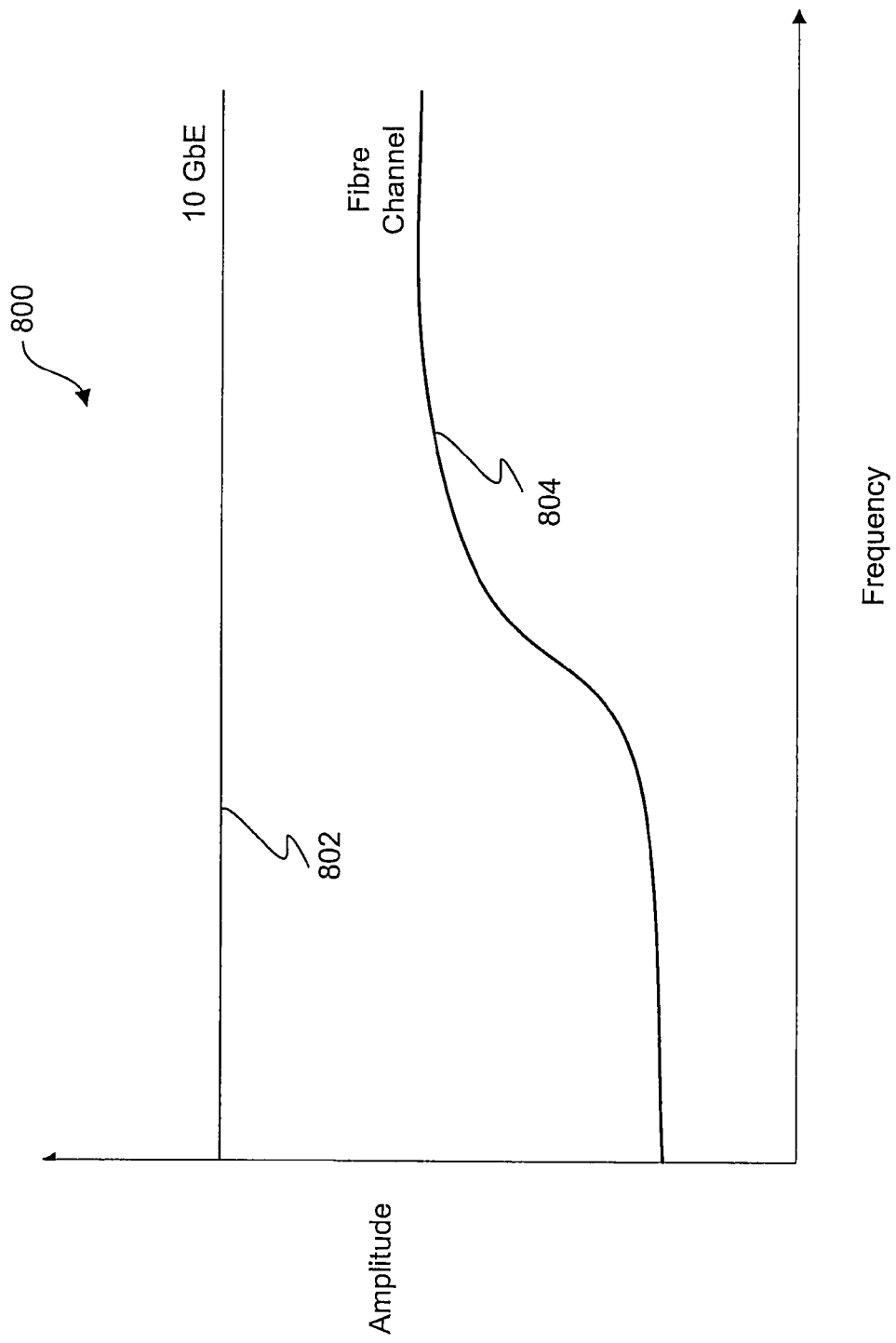
FIG. 8 is a plot illustrating exemplary equalization profiles according to an embodiment of the invention.

FIG. 8 is a plot 800 illustrating exemplary equalization profiles according to an embodiment of the invention. Referring to FIG. 8, plot 800 may include curves 802 and 804. Curve 802 may be the resultant equalization profile for selection of only the equalization stage 706 (FIG. 7). In an illustrative embodiment, the resultant equalization profile depicted by curve 802 may be selected exclusively for Fibre channel operation mode. In that case, a receiver or transceiver may operate exclusively in a Fibre channel mode. Curve 804 may be the resultant profile for selection of only the low-frequency gain stage 702 (FIG. 7). In an illustrative embodiment, the resultant equalization profile depicted by curve 804 may be selected exclusively for 10 GbE operation mode. In a case where n=3, the signal divider 704 may be controlled by a 3-bit select signal. Accordingly, the select value 000 may be used to select an equalization profile, which may represent an exclusive Fibre channel operation mode. The select value 111 may be used to select an equalization profile, which may represent an exclusive 10 GbE operation mode. Other intermediate equalization profiles, corresponding to 3-bit select values 001-110, may lie between curves 802 and 804.

Figure 9:
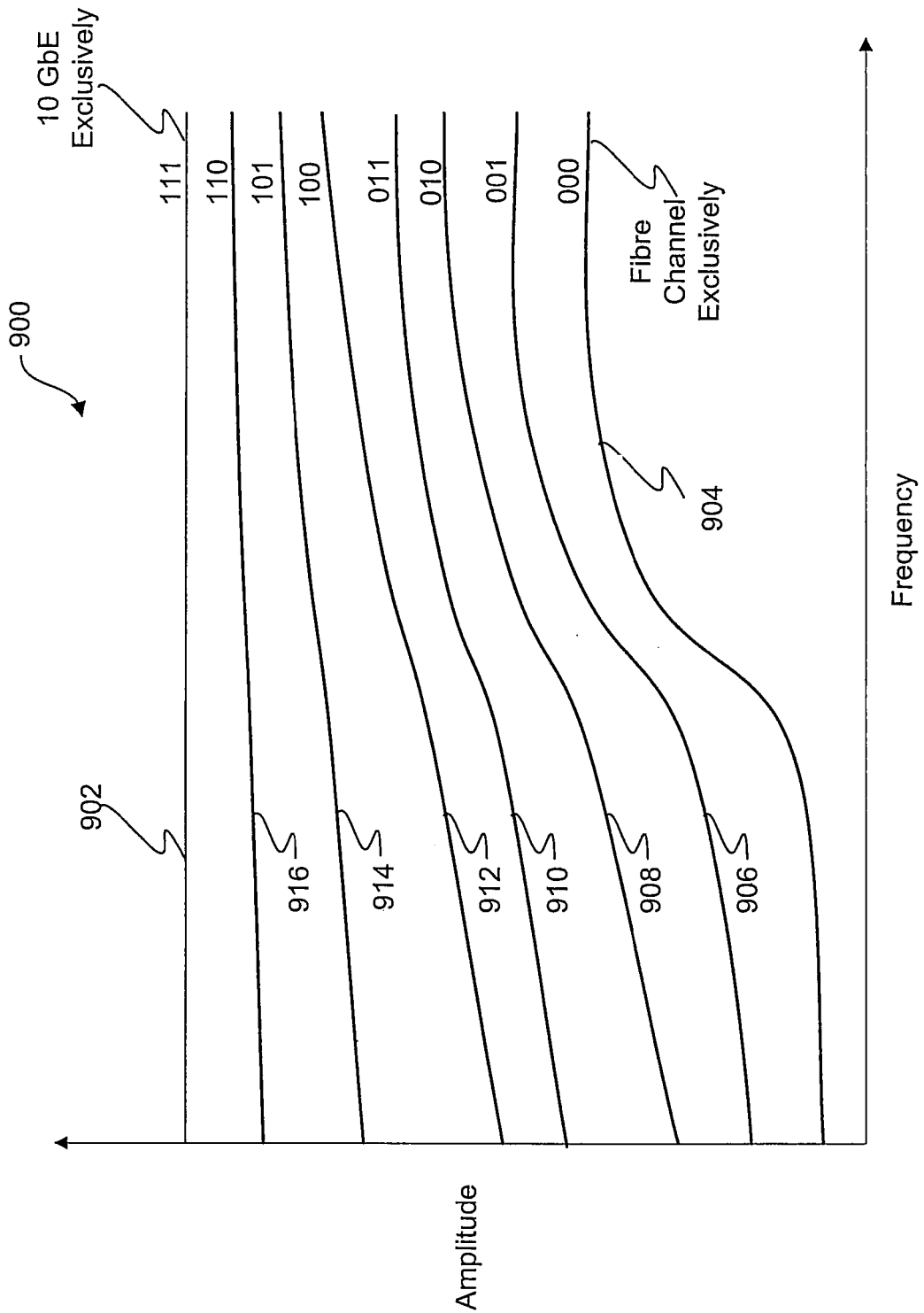
FIG. 9 is plot for exemplary equalization profiles in accordance with an embodiment of the invention.

FIG. 9 is plot 900 for exemplary equalization profiles in accordance with an embodiment of the invention. Referring to FIG. 9, there are illustrated equalization profiles curves 902, 916, 914, 912, 910, 908, 906, and 904. In this exemplary case, n=3, and the exclusive Fibre channel operation mode may utilize select bit value 000, which may be represented by curve 904. The exclusive 10 GbE operation mode may utilize select bit value 111, which may be represented by equalization profile curve 902. The equalization profiles curves 916, 914, 912, 910, 908, 906 may be represented by bit select 110, 101, 100, 011, 010, and 001, respectively. Equalization profiles curves 916, 914, 912, 910, 908, 906 may represent intermediate operations for various combinations of 10 GbE and Fibre channel modes of operation. Accordingly, depending on a particular characteristic of a combination of operation modes, an appropriate intermediate equalization profile may be selected.

It should be recognized that the invention is not limited to a value of n=3, but n may preferably have a value which may be greater than or equal to ($\geq$) two (2). In a case where n=1, then only an exclusive 10 GbE operation mode or an exclusive Fibre channel operation mode may be provided, and there may be no intermediate operational modes. In this regard, zero (0) may represent the exclusive 10 GbE operation mode and one (1) may represent an exclusive Fibre channel operation mode. Alternatively, one (1) may represent the exclusive 10 GbE operation mode and zero (0) may represent an exclusive Fibre channel operation mode.

In an alternative embodiment of the present invention, the entire input communication signal may be provided to both the low-frequency gain stage 702 and the equalization stage 706, rather than apportioning the input signal in accordance with the arrangements previously described. Accordingly, the select values may determine how much gain may be provided by the low-frequency gain stage 702 and the equalization stage 706. In an illustrative embodiment of the invention, in a case where n=3, if the 3-bit select value is 000, the low-frequency gain stage 702 of the equalization element 700 may be configured to provide a high amount of gain, while the equalization stage may be configured to provide a lesser or no amplification to the input signal. If the 3-bit select value is 111, the equalization stage 706 may be configured to provide a high degree of amplification, while the low-frequency gain stage 702 may provide a lesser or no gain to the input signal. Select values 001-110 may provide varying intermediate levels or degrees of amplification by the two stages.

In one embodiment of the invention, the signal divider 704 may be adapted to operate as a splitter. In this regard, the input signal may be split by the signal divider 704 so that the entire input signal may be provided to both the low-frequency gain stage 702 and the equalization stage 706, rather than being apportioned. In this regard, both low frequency and high frequency components of the input signal may be provided to the low-frequency gain stage 702 and the equalization stage 706. Accordingly, a particular select value may be utilized to adapt the signal divider 704 to operate as a splitter. For example, a select value of 100 may be appropriated to configure the signal divider 704 to operate as a splitter. The select signal 704 may be coupled directly to the low-frequency gain state 702 and the equalization stage 706 of the equalization element 700.

In a further aspect of the invention, one or more bits and/or registers may be configured to control the select signal 710. For example, MDIO pin 380 may be coupled to the select signal 710. In this arrangement, one or more bits and/or registers in the management registers and control interface block 372 (FIG. 3) of the single-chip multimode multi-sublayer PHY 130, may be programmed with the select values. The select value may be programmed to a default value, for example during manufacturing. The select value may also be reprogrammed at any time, for example during initialization or operation, in order to effect a different equalization and low-frequency gain combination. In this regard, the single-chip multimode multi-sublayer PHY 130 may have a capability to adaptively select an optimal combination of signal equalization and low frequency gain.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for optimizing operation of a transceiver device, the method comprising:
    dividing an input signal into a first signal portion and a second signal portion based on a select signal, said select signal comprising a plurality of select levels;
    parallel processing said first signal portion through a first path having a first frequency response, and said second signal portion through a second path having a second frequency response, wherein the second frequency response is higher than the first frequency response; and
    combining signals from the first and second paths, creating an output signal having a desired gain and frequency.

2. The method according to claim 1, wherein the parallel processing adjusts a gain of at least one of the first path and the second path.

3. The method according to claim 2, wherein the parallel processing equalizes at least one of the first frequency response and the second frequency response.

4. The method according to claim 1, wherein the input signal is from a 10 GBit Ethernet channel.

5. The method according to claim 1 wherein the input signal is from a Fibre channel.

6. A system for optimizing operation of a transceiver device, the system comprising:
    a divider operable to divide an input signal into a first signal portion and a second signal portion based on a select signal, said select signal comprising a plurality of select levels;
    a parallel processor operable to process said first signal portion through a first path having a first frequency response, and said second signal portion through a second path having a second frequency response, wherein the second frequency response is higher than the first frequency response; and
    a combiner for combining signals from the first and second paths, creating an output signal having a desired gain and frequency.

7. The system according to claim 6, wherein the parallel processor is operable to adjust a gain of at least one of the first path and the second path.

8. The system according to claim 6, wherein the parallel processor is operable to equalize at least one of the first frequency response and the second frequency response.

9. The system according to claim 6, wherein the input signal is from a 10 GBit Ethernet channel.

10. The system according to claim 6, wherein the input signal is from a Fibre channel.

11. A system for optimizing operation of a transceiver device, the system comprising:
    one or more circuits that are operable to divide an input signal into a first signal portion and a second signal portion based on a select signal, said select signal comprising a plurality of select levels;
    said one or more circuits are operable to parallel process said first signal portion through a first path having a first frequency response, and said second signal portion through a second path having a second frequency response, wherein the second frequency response is higher than the first frequency response; and said one or more circuits are operable to combine signals from the first and second paths, creating an output signal having a desired gain and frequency.

12. The system according to claim 11, wherein the parallel processing adjusts a gain of at least one of the first path and the second path.

13. The system according to claim 12, wherein the parallel processing equalizes at least one of the first frequency response and the second frequency response.

14. The system according to claim 11, wherein the input signal is from a 10 GBit Ethernet channel.

15. The system according to claim 11, wherein the input signal is from a Fibre channel.

16. A system for optimizing operation of a transceiver device, the system comprising:

at least one processor that enables dividing an input signal into a first signal portion and a second signal portion based on a select signal, said select signal comprising a plurality of select levels;

said at least one processor enables parallel processing of said first signal portion through a first path having a first frequency response, and said second signal portion through a second path having a second frequency response, wherein the second frequency response is higher than the first frequency response; and said at least one processor enables combining of signals from the first and second paths, creating an output signal having a desired gain and frequency.

17. The system according to claim 16, wherein the parallel processing adjusts a gain of at least one of the first path and the second path.

18. The system according to claim 17, wherein the parallel processing equalizes at least one of the first frequency response and the second frequency response.

19. The system according to claim 16, wherein the input signal is from a 10 GBit Ethernet channel.

20. The system according to claim 16, wherein the input signal is from a Fibre channel.

* * * * *